(12) United States Patent
Telander

(10) Patent No.: US 8,043,982 B2
(45) Date of Patent: Oct. 25, 2011

(54) BASALT PARTICLE-CONTAINING COMPOSITIONS AND ARTICLES FOR PROTECTIVE COATINGS AND BALLISTIC SHIELD MATS/TILES/PROTECTIVE BUILDING COMPONENTS

(75) Inventor: William Telander, Orland Park, IL (US)

(73) Assignee: U.S. Wind Farming, Inc., Orland Park, IL (US)

( * ) Notice: Subject to any disclaimer, the term of this patent is extended or adjusted under 35 U.S.C. 154(b) by 283 days.

(21) Appl. No.: 12/240,094

(22) Filed: Nov. 3, 2008

(65) Prior Publication Data
US 2010/0285269 A1 Nov. 11, 2010

Related U.S. Application Data

(63) Continuation of application No. 11/142,035, filed on Jun. 1, 2005.

(51) Int. Cl.
*B32B 27/12* (2006.01)
*B32B 27/04* (2006.01)

(52) U.S. Cl. .......................... 442/134; 442/135; 428/911
(58) Field of Classification Search .................. 442/134, 442/135
See application file for complete search history.

(56) References Cited

U.S. PATENT DOCUMENTS 4,201,247 A * 5/1980 Shannon ....................... 138/141
5,167,876 A * 12/1992 Lem et al. ...................... 252/602

\* cited by examiner

*Primary Examiner* — Lynda Salvatore
(74) *Attorney, Agent, or Firm* — Marshall, Gerstein & Borun LLP

(57) ABSTRACT

It has been found that basalt particles, when combined with a resin binder and a reinforcing material, such as fiberglass, provide unexpected strength, fire-resistance, radiation impermeability, and projectile shielding for ballistic armor/shields, fire-resistant building panels, construction blocks and protective coatings on substrates. The armor panels can be worn, as in a bullet-proof vest, or can be used as a shield to protect a vehicle, aircraft or other structures as projectile penetration-resistant and fire and radiation resistant materials.

15 Claims, 3 Drawing Sheets

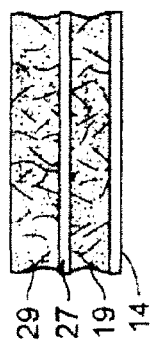
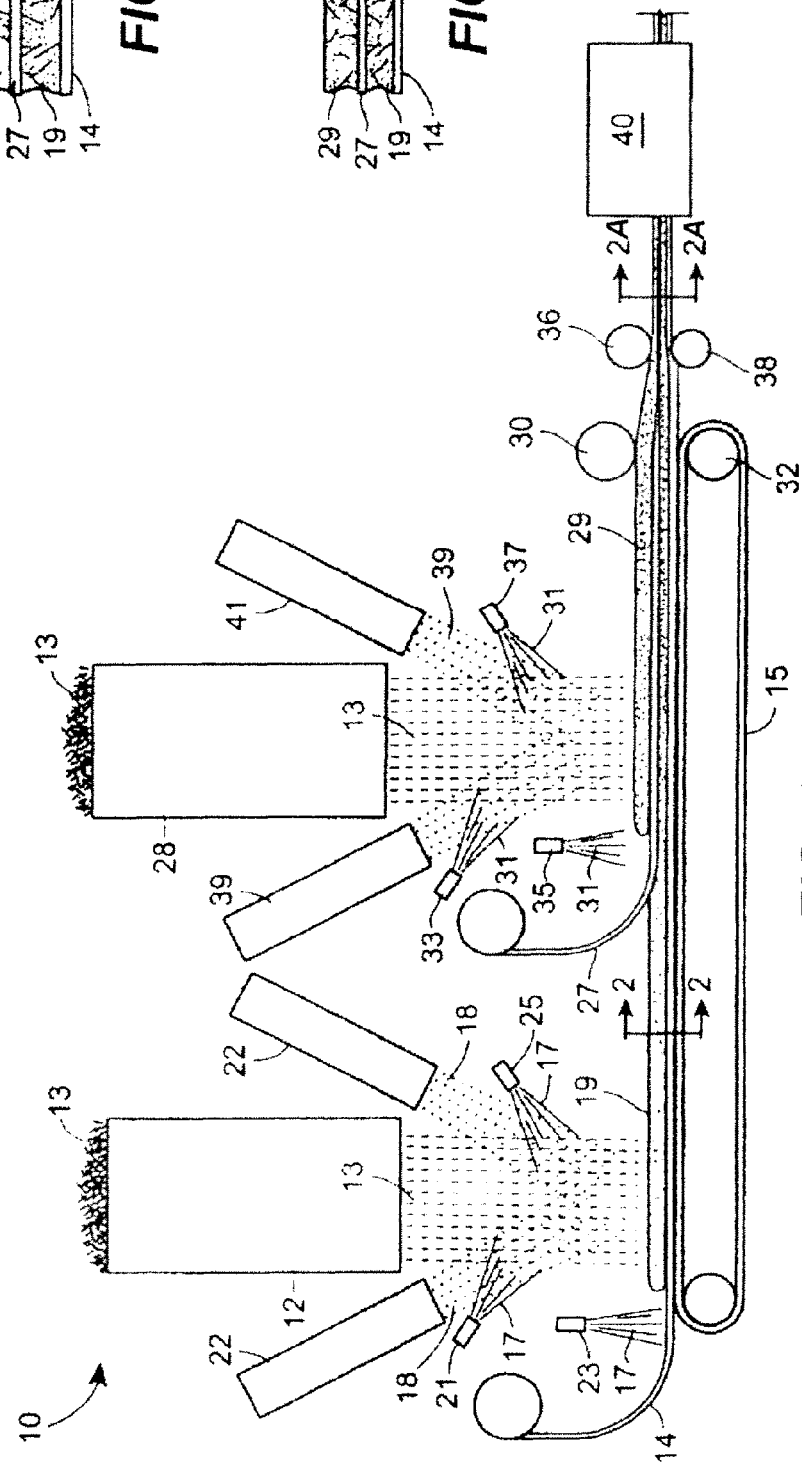

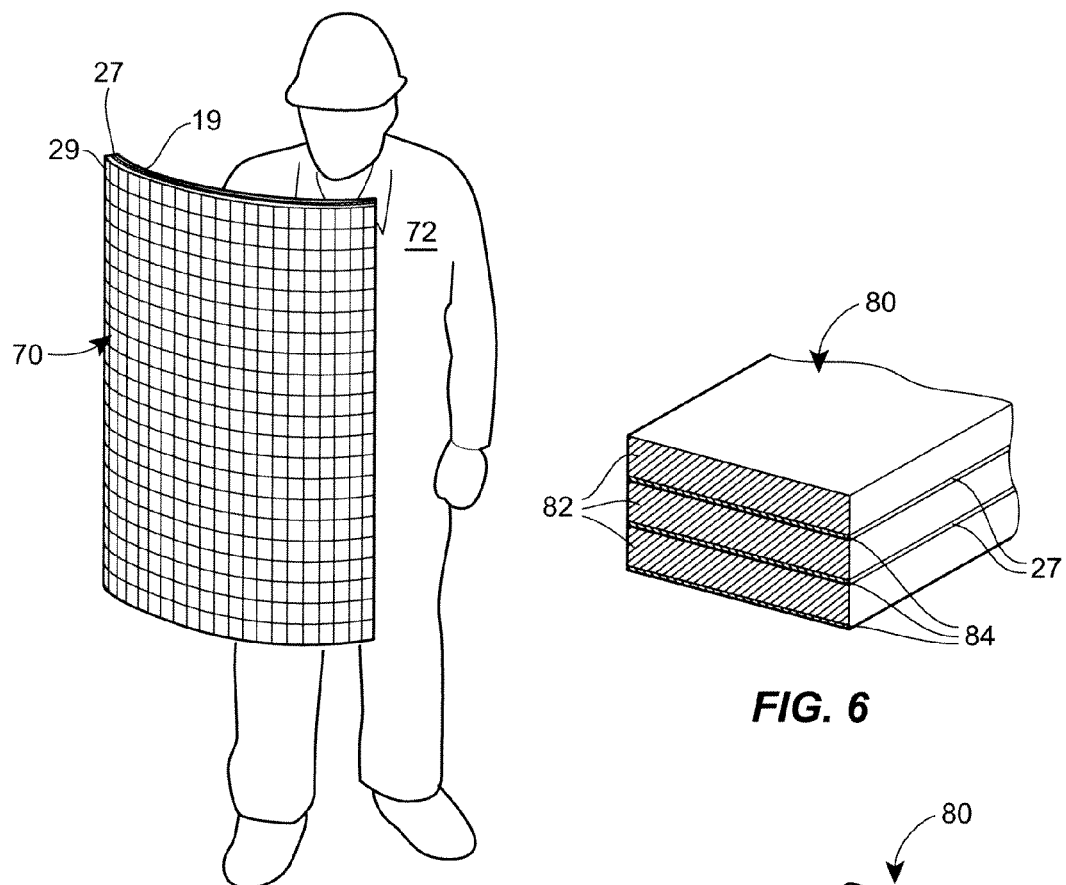
FIG. 5
FIG. 6
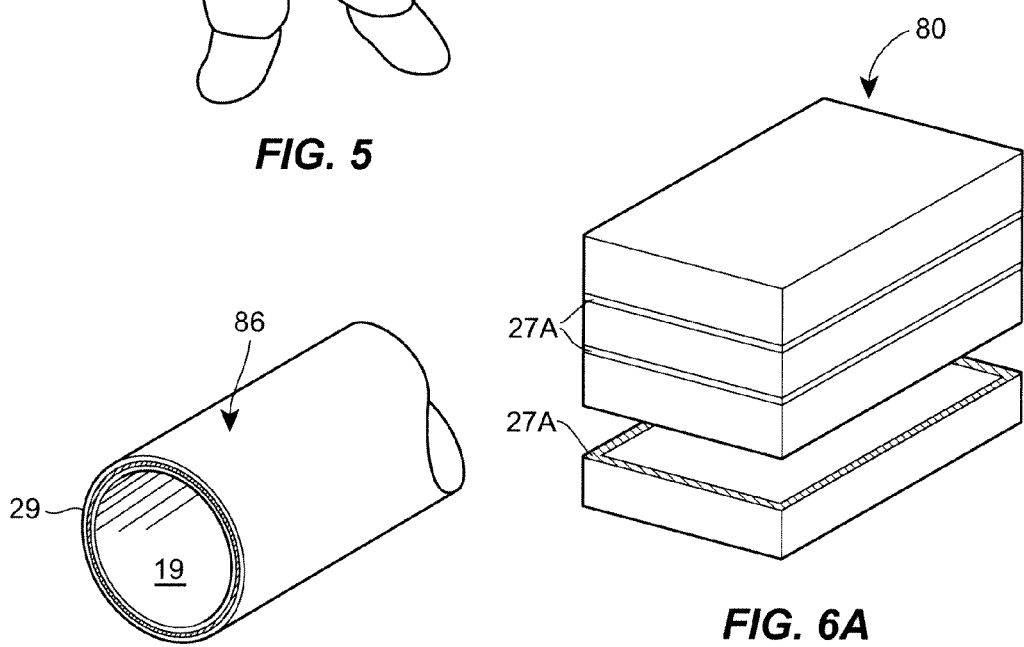
FIG. 7
FIG. 6A

BASALT PARTICLE-CONTAINING COMPOSITIONS AND ARTICLES FOR PROTECTIVE COATINGS AND BALLISTIC SHIELD MATS/TILES/PROTECTIVE BUILDING COMPONENTS

CROSS-REFERENCE TO RELATED APPLICATION

This application is a continuation of U.S. patent application Ser. No. 11/142,035 filed Jun. 1, 2005. The entire text of the priority application is incorporated herein by reference in its entirety.

FIELD OF THE INVENTION

The present invention is directed to basalt particle-containing composite compositions, and methods of manufacture. It has been found that basalt particles, when combined with a resin binder and a reinforcing material, such as fiberglass, provide unexpected shielding results for ballistic armor/shields; fire-retardant, self-extinguishing building panels; construction blocks and protective coatings on substrates. The armor panels can be worn, as in a bullet-proof vest, or can be used as a shield to protect a vehicle, aircraft or other structures as projectile penetration-resistant and fire-retardant materials.

BACKGROUND AND PRIOR ART

Basalt is an igneous mineral ore that can be melted and formed into continuous fibers, staple fibers, e.g., 30 mm in length, micro fibers of, for example, 0.42 μm in diameter, and intermediate lengths and diameters. Basalt fibers have been (a) used to make papermaking fabric, see U.S. Pat. No. 6,926,221; (b) zirconia coated for alkali resistance, see J. Mater. Res., Vol. 9, No. 4, p. 1006 (1996); (c) used for internally reinforcing cement in concrete see U.S. Pat. No. 4,304,604, to reinforce thermosetting resins, particularly epoxy resins and polyester resins, see Popular Plastics, February, 1982, pages 6-8; and (d) formed from a melt of both glass and basalt rock, UK published application 2,019,386 A (1979).

Basalt also has been cut, like granite, to form decorative floor and wall tiles, counter tops, vanities, and the like, and has been smelted at 2,400° C. and cast into tiles for kitchen, baths, churches and cathedrals. Fused basalt powder beads also have been incorporated into thermosetting resins to produce shaped articles, as described in U.S. Pat. No. 6,114,464. Basalt powder also has been mixed with glass powder, ground to a fineness of 1.35 m²/g BET and processed into a foamed glass, as described in U.S. Pat. No. 4,178,163.

Protective armor for heavy but mobile military equipment, such as tanks, high mobility multipurpose wheeled vehicles, e.g., Humvees, aircraft and ships, is known. Such armor usually comprises a thick layer of alloy steel, which is intended to provide protection against heavy and explosive projectiles. Due to its weight, such armor is quite unsuitable for light vehicles such as automobiles, jeeps, light boats, or aircraft, whose performance is compromised by steel panels having a thickness of more than a few millimeters.

Armor for light vehicles is expected to prevent penetration of bullets of any weight, even when impacting at a speed in the range of 700 to 1000 meters per second.

Another consideration in armor design is compactness. A thick armor panel, including air spaces between its various layers, increases the target profile and the wind resistance of the vehicle. In the case of civilian retrofitted armored automobiles which are outfitted with internal armor, there is simply no room for a thick panel in most of the areas requiring protection.

Fairly recent examples of armor systems are described in U.S. Pat. No. 4,836,084, disclosing an armor plate composite including a supporting plate consisting of an open honeycomb structure of aluminum; and U.S. Pat. No. 4,868,040, disclosing an antiballistic composite armor including a shock-absorbing layer. Also of interest is U.S. Pat. No. 4,529,640, disclosing spaced armor including a hexagonal honeycomb core member.

Other armor plate panels are disclosed, e.g., in British Patents 1,081,464; 1,352,418; 2,272,272, and in U.S. Pat. No. 4,061,815 wherein the use of sintered refractory material, as well as the use of ceramic materials, are described.

Ceramic materials are nonmetallic, inorganic solids having a crystalline or glassy structure, and have many useful physical properties, including resistance to heat, abrasion and compression, high rigidity, low weight in comparison with steel, and outstanding chemical stability. Such properties have long drawn the attention of armor designers, and solid ceramic plates, in thicknesses ranging from 3 mm. for personal protection to 50 mm. for heavy military vehicles, are commercially available for such use. Ceramic shields, however, shatter when struck by a fast moving projectile and, therefore, cannot protect against multiple projectiles that strike in close proximity, as occurs with automatic weapons fire.

Much research has been devoted to improving the low tensile and low flexible strength and poor fracture toughness of ceramic materials; however, these remain the major drawbacks to the use of ceramic plates and other large components which can crack and/or shatter in response to the shock of incoming projectiles.

A known form of armor plating using ceramics is produced in Israel by Kibbutz Beit Alpha. It comprises cutting 5 mm steel plates to the sizes required, heat-treating the steel and adding a ceramic coating. One disadvantage of this type of panel is that on completion, the panels are almost impossible to modify. In use, the ceramic coating performs well against the first bullet, but tends to shatter, and thus fails to protect against further projectiles.

Light-weight, flexible armored articles of clothing have also been used for many decades, for personal protection against fire-arm projectiles and projectile splinters. Examples of this type of armor are found in U.S. Pat. No. 4,090,005. Such clothing is certainly valuable against low energy projectiles, such as those fired from a distance of several hundred meters, but fails to protect the wearer against high-velocity projectiles originating at closer range. If made to provide such protection, the weight and/or cost of such clothing discourages its use. A further known problem with such clothing is that even when it succeeds in stopping a projectile, the user may suffer injury due to indentation of the vest to the body, caused by too small a body area being impacted and the inability to absorb the energy of a bullet.

A common problem with prior art ceramic armor concerns damage inflicted on the armor structure by a first projectile, whether stopped or penetrating. Such damage weakens the armor panel, and so allows penetration of a following projectile.

The basalt particle-containing composite articles described herein cause an array of incoming projectiles to pancake or flatten without shattering the articles, while protecting a person or structure without requiring frequent replacement.

SUMMARY

The basalt particle-containing compositions, mats, shields, building components, coatings and panels, and methods described herein obviate some or all of the disadvantages of prior art ceramic armor, shields and building components and provide articles, e.g., armor shields and building components, that are fire-retardant and effective against firearm and explosive device projectiles, yet are of light-weight, and low bulk.

One aspect of the basalt particle-containing compositions, articles, methods, building components and panels described herein is to provide an armor mat, panel or building block that can be manufactured in a desired shape and size, and which is particularly effective in arresting a plurality of projectiles impacting upon the same general area of the manufactured article that contains at least one layer of basalt particles bound by a binder. In another embodiment, the basalt particles are bound in adjacent layers, or in multiple mats/panels that are adhesively joined together.

Another aspect of the compositions, mats, shields, building components, coatings, panels, and methods described herein is to provide a basalt particle-containing building structure, such as a wall panel or building block, that contains a sufficient density of basalt particles for fire and resistance to penetration by projectiles yet is relatively light weight and adapted to be manufactured in any desired size and shape.

The basalt particle binder can be any suitable adhesive material, such as an epoxy or polyester or vinylester resin; a molten metal, e.g., aluminum, or any adhesive thermoplastic polymer or thermosetting polymer, i.e., any adhesive resin binder.

Another aspect of a further preferred embodiment of the compositions, mats, shields, building components, coatings, panels, and methods described herein, is to provide a multi-layered armor panel, comprising an outer, impact-receiving panel of composite basalt particle-containing material, as described herein, laminated to a film or fabric material (woven or non-woven), capable of catching a projectile that penetrates the basalt particle-containing outer layer.

Other uses for the mats, panels, building blocks, building wall components, coatings and other articles described herein include: ablative shock absorbing articles; bullet-fragment resistive articles; conformingly-shaped composites for protective transportation, building barricades and personal protection; lightweight fiber reinforced laminates, panels, and liners for personal and structural defense capable of protecting structures and people against weaponry ranging from low caliber ammunition to explosives; composite construction materials for initial construction of buildings or outer wall add-ons therefore; precast bomb shielding panels, facades, doors and walls; steel/basalt-particle composite multiple layer laminate structures; armor for custom placement in cars, buses, trucks and other structures; radiation shields; composite materials for the manufacture of airfoils and helicopter blades; basalt/polymer coating compositions for intumescent coatings; rebar, concrete and stucco compositions; substitutes for ceramic particles in any ceramic-containing composition; and unobtrusive articles for personal property protection.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

BRIEF DESCRIPTION OF THE DRAWINGS

FIG. 1 is a schematic diagram of a continuous method of manufacturing a basalt particle-containing ballistic shield and/or fire-retardant building panel in accordance with the compositions and methods described herein;

FIG. 2 is a partially broken-away, cross-sectional view of the basalt particle-containing article manufactured as shown in FIG. 1, taken along the line 2-2 of FIG. 1;

FIG. 2A is a partially broken-away, cross-sectional view of the basalt particle-containing article manufactured as shown in FIG. 1, taken along the line 2A-2A of FIG. 1;

FIG. 5 is a perspective view of a basalt particle-containing curved shield manufactured as described herein;

FIG. 6 is a partially broken-away perspective view of a ballistic shield material, similar to FIG. 2, showing multiple layers of basalt particle panels and woven basalt fiber fabrics that can be laminated in any number of layers to stop multiple, closely spaced, high speed projectiles; and FIG. 7 is a perspective view of a pipe or conduit formed from multiple, alternating layers of (1) a mat of reinforcing fibers, e.g., a fiberglass mat, and (2) a coating composition of an adhesive resin and up to about 80% basalt particles, produced on a mandrel.

DETAILED DESCRIPTION

Protective Panels/Shields/Building Components

Figure 3:
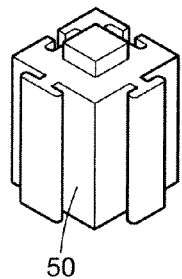
FIG. 3 is a perspective view of a basalt particle-containing, interconnecting building block manufactured as described herein.

The preferred form of the ballistic shields, portable police barriers and wall components and blocks for buildings, bunkers and other articles described herein, is a mat or panel formed from a combination of a thermosetting adhesive resin binder and about 10% by weight to about 80% by weight, preferably about 20% to about 70% by weight, basalt particles. To achieve the full advantage of the ballistic shield embodiment, the basalt particles should be smaller than about 8 mm, preferably smaller than about 4 mm. More preferably, for the ballistic shield embodiment, the particle size for the basalt particles is No. 325 mesh, or smaller than 0.044 mm. Most preferably, the basalt particles are a powder having a particle size distribution wherein 100% of the particles are smaller than 0.044 mm, with at least about 40% of the particles, by number, smaller than 0.037 mm, at least 10% of the particles, by number, smaller than 0.025 mm, with at least 10%, preferably at least 20%, by number, of the particles between 0.037 mm and 0.044 mm, and at least 10%, preferably at least 20%, of the particles, by number, between 0.025 mm and 0.037 mm. It is theorized that the smaller particles bridge the larger particles and aid in force absorption upon impact by a ballistic missile, e.g., a bullet or sequence of bullets. Preferably, the articles are manufactured to a thickness of about 1 mm to about 50 mm in thickness, more preferably about 3 mm to about 30 mm, even more preferably about 5 mm to about 20 mm, most preferably about 5 mm to about 10 mm.

The ballistic shield mats or panels, building blocks and coating compositions described herein, preferably also include at least one structural reinforcing material, preferably reinforcing fibers, such as fiberglass fibers or basalt fibers;

aramid fibers, e.g., KEVLAR; carbon fibers; boron fibers; basa fibers; asbestos fibers; boron carbide fibers; and/or the like (chopped to any length, strands of any length, and/or woven and/or a non-woven mats or fabrics of any of these fibers). The panels shields, mats, building components and cured coatings of the embodiments described herein that contain reinforcing fibers should contain the reinforcing fibers in an amount of about 2% by weight to about 50% by weight of the cured article or coating, preferably about 5% to about 40% by weight, more preferably about 10% to about 30% by weight. The polymeric binder should be included in the cured articles and coatings described herein in an amount of about 5% by weight to about 50% by weight, preferably about 10% to about 40% by weight, more preferably about 20% to about 30% by weight.

In addition to military applications and improvements to homeland, government, and industrial security, the basalt particle-containing articles and coatings described herein are beneficial in law enforcement, and target ranges.

Law enforcement and civilian sport shooters will benefit from the ability of the basalt particle-containing articles described herein to improve the safety of firing ranges. Problems with shooting ranges and target facilities, such as those used by law enforcement, commercial operations and private shooters, include potential ricochet, limits on safe shooting distance, restrictions on permissible bullet type and cartridge load, and environmental contamination issues, especially involving spent lead. The basalt particle-containing articles and coatings described herein also are useful in training targets, bullet traps, live-fire shoot houses, and firing ranges, both indoors and outdoors. The material is suitable for targets and backstops, as well as along sidewalls, to capture stray projectiles in any range configuration. Targets and backstops made from the basalt particle-containing articles described herein permit target training from any distance, including point-blank range, as well as training with actual duty ammunitions since the articles capture and flatten projectiles fired from extreme oblique angles, virtually eliminating ricochet.

Interlocking and/or adhesively attached building blocks, e.g., square or rectangular hollow blocks (4-sided or six-sided) that are produced in multi-sided molds can be produced in virtually any size for easy and fast permanent or temporary construction of projectile-stopping barriers, such as in erecting a bunker in a military operation; for construction of governmental buildings, embassies, and the like.

As well known in the building art, interlocking blocks can interlock on four to six sides with any other cube of the same size, affording speed of assembly and endless flexibility in configuration. No tools or formal instructions are required for assembly, and every cube of the same size is identical to all its mates; requiring no special corner modules or end caps. Three-dimensional, six-sided interlocking cubes containing basalt particles form extremely strong, fireproof and projectile flattening structures that may be built to any desired size and configuration, with walls of any thickness. After use, the modules are easily disassembled for storage or transportation for reuse.

The basalt-containing articles described herein may be used to shield bunkers, buildings, pipelines, pumping stations, wheeled military vehicles, e.g., Humvees, aircraft (e.g., molded to conform to an inner or outer surface of an aircraft fuselage), any critical need equipment or installation that requires protection from ballistic or explosive attack. The articles and coatings described herein are extremely valuable to military units with a need for permanent, semi-permanent or highly mobile physical security. Existing buildings are easily and quickly secured with the basalt-containing articles described herein, and the building panels, blocks and articles described herein are also useful for new construction.

Oil field facilities, refineries, thousands of miles of petroleum pipelines, and thousands of pumping stations can be shielded with the basalt particle-containing articles described herein. Government buildings, financial and health institutions, chemical plants, military outposts, both at home and abroad, also can be shielded with the basalt-containing articles described herein, against bomb blasts, rocket-propelled grenades, automatic weapons fire and other means of attack. Soldiers, especially in close combat, can quickly construct mobile bunkers using the articles described herein, and the bunkers can be easily broken down for rapid mobility.

The basalt-containing panels, blocks, and planar and curved shields described herein can easily be laminated to decorative or camouflage outer surface films or fabrics so that they are aesthetically appealing, while providing extreme protection against ballistic penetration.

Multiple layers of reinforcing fibers or fabrics provide additional strength and better projectile catching capabilities, should an extremely powerful projectile penetrate a relatively thin layer of the basalt particle-containing articles described herein. Reinforcing fabrics can be disposed internally during the manufacture of the basalt particle-containing mats/panels described herein or it (they) can be adhesively laminated on one or both major outer surfaces of the articles during or after manufacture.

Unidirectional fabrics are inherently much stronger than plain weave or even twill weaves, in the longitudinal direction, because they have almost all of the fibers running in one direction. This also means they are much weaker in the opposite direction, perpendicular to their long strands. The articles described herein can be manufactured by laying down multiple layers of unidirectional fabric by varying the angle of each layer, e.g., the innermost layer at 0 degrees, the next layer at 90 degrees and the next layer at 0 degrees again. The final structure will have more strength in the 0 degree direction, but by adding the layer at 90 degrees (perpendicular to the other two layers) it will have added strength in that direction as well. A combination of alternating layers of a non-woven fabric and a woven fabric, each wetted with a basalt/resin composition is preferred for helical windings, as in the production of pipes and conduits, as shown in Example 2, to follow.

The composite articles described herein can be manufactured in any known way to manufacture a composite article, e.g., a fiberglass boat hull. For example, the composite articles can be made by a "hand-layup" described as laying up a reinforcing, e.g., fiberglass, fabric and wetting it out by hand with an adhesive resin/basalt mixture (with or without an initial gel coat if a smooth outer surface is unnecessary). If no other heat or pressure is being applied to the part, it leaves the thickest wall for a given part because it has the highest amount of resin. The strength of the articles described herein resides in the basalt particles and in the reinforcing fibers, not in the resin. Vacuum bagging, autoclave or some other form of force, e.g., press molding, that helps squeeze out excess resin are useful to maximize the weight percent of basalt particles and reinforcing fibers contained in the articles described herein. Lowering the resin content will increase the strength of the basalt particle-containing articles described herein.

Vacuum bagging compresses the articles, thus reducing the resin content, which makes it stronger. The process also gets rid of air bubbles, moisture and pushes the reinforcing fibers closer together. Decreasing the resin content reduces the thickness of the article, which means it is lighter, and it is stronger because the fibers are closer together and the basalt particles are more densely packed together.

Aerospace usually produces parts with resin contents (by weight of the final part) anywhere from 25% to 50%. A variation on vacuum bagging, by applying heat to the part, e.g., in an autoclave, to apply pressure instead of a vacuum also can reduce the resin content of the articles described herein down to about 10% to about 15% by weight, even further than vacuum bagging, and speeds up the curing process.

Adhesive Binders

Any known polymeric binder is suitable for binding the basalt particles together to manufacture the basalt particle-containing ballistic shields/armor plates building components and coatings described herein. Suitable adhesive resin binders including epoxy binders, e.g., Bisphenol A and Bisphenol F based epoxies; phenoxy resins; polyester resins; vinyl ester resins; phenolic resins; novolac resins; phenol/novolac resins; polyamide, e.g., nylon resins; and the like. The epoxy resins are preferred since they have the highest adhesion values. Known suitable curing agents and/or polymerization accelerators are added to the articles when disposed into the desired shape.

The basalt-containing coatings and ballistic shields described herein can be admixed with all market available epoxy resin systems. Examples of suitable epoxy resins include: bisphenol A-derived resins, epoxy cresol novolac resins, epoxy phenol novolac resins, and the like.

In general, suitable epoxy and phenoxy resins are aliphatic-, cycloaliphatic-, or aromatic-based epoxy resins, such as, for example, epoxy resins represented by structural formulae I and II:

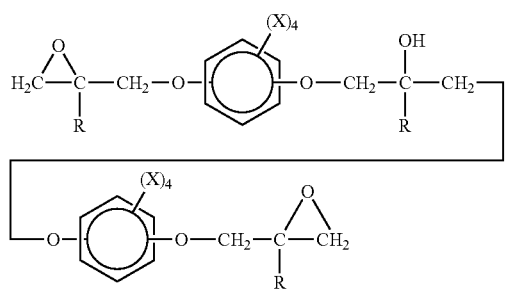
(I)

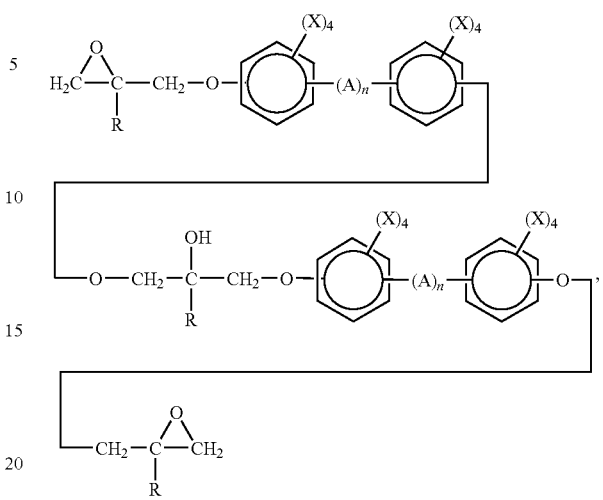
(II)

wherein in each A is, independently, a divalent hydrocarbyl group having 1 to about 12, preferably 1 to about 6, and most preferably 1 to about 4, carbon atoms; each R is, independently, hydrogen or an alkyl group having 1 to about 3 carbon atoms; each X is, independently, hydrogen, a hydrocarbyl or hydrocarbyloxy group having 1 to about 12, preferably 1 to about 6, and most preferably 1 to about 4, carbon atoms, or a halogen atom, preferably chlorine or bromine; n is 0 or 1, and n' has an average value of about 2 to about 30, and preferably 10 to about 30.

In particular, the preferred epoxy and phenoxy resins are the (diglycidyl ether/bisphenol-A) resins, i.e., polyether diepoxides prepared by the polymeric adduction of bisphenol-A (III)

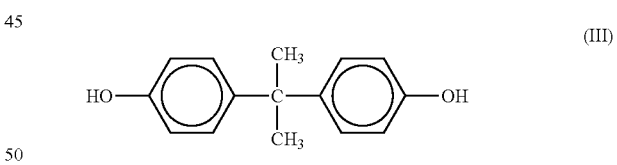
(III)

and the di-glycidyl ether of bisphenol-A (IV).

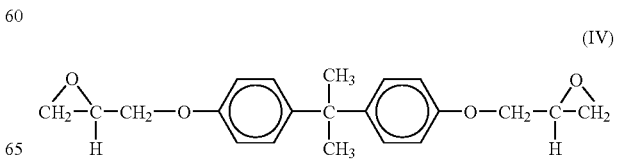
(IV)

In this case, the epoxy resin is a mixture including polymeric species corresponding to different values of n' in the following idealized formula V:

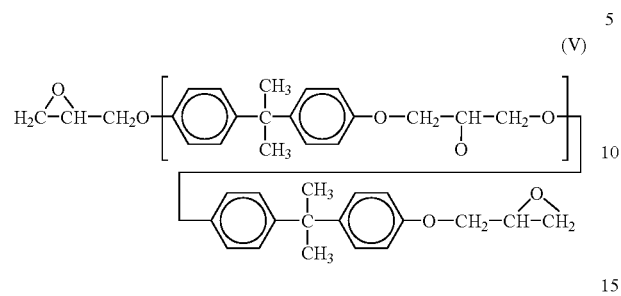

wherein n' is a number from about 2 to about 30.

In addition to bisphenol-A, useful epoxy and phenoxy resins can be prepared by reacting a diglycidyl ether of a bisphenol listed below with an exemplary, but non-limiting, bisphenol listed below:

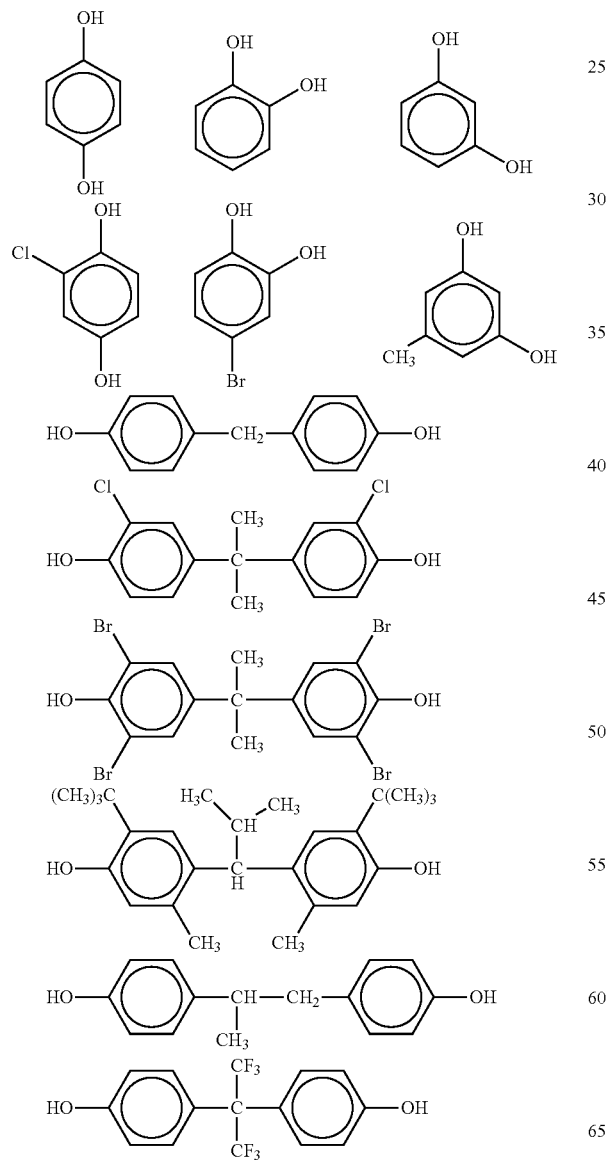

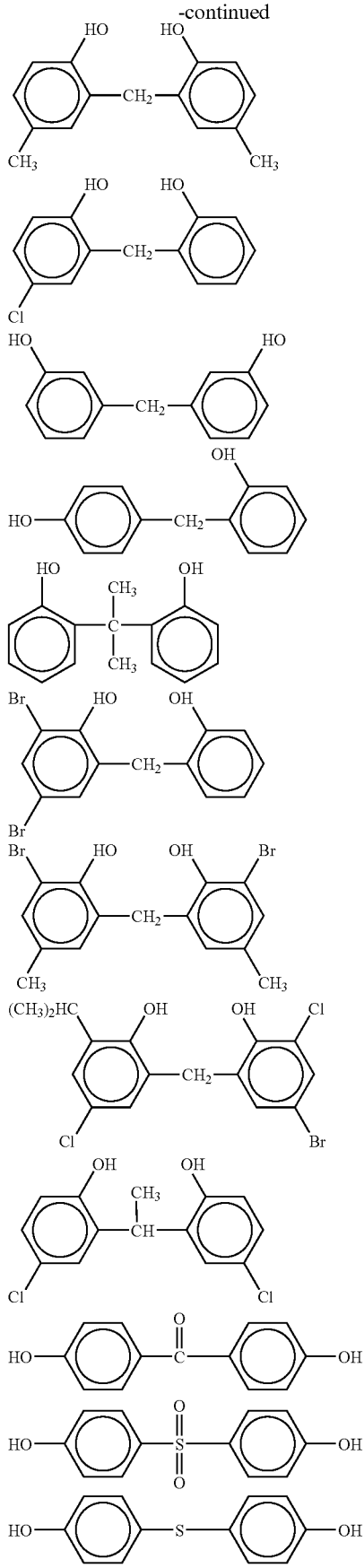

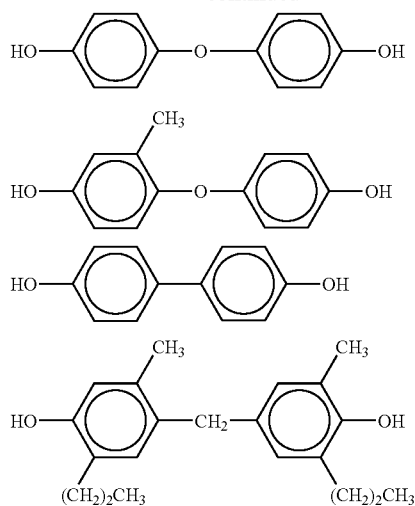

Other epoxy resins that can be used as the adhesive resin for the basalt powder-containing compositions described herein are prepared from the following starting epoxy-containing materials. These epoxy-containing materials are reacted with bisphenol-A or another bisphenol to adjust the molecular weight of the epoxy resin, as desired.

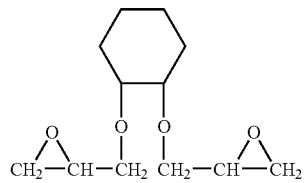

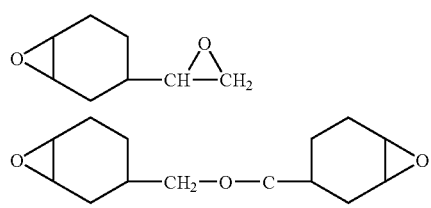

Epoxy novolac resins useful in making the compositions described herein include polyfunctional epoxy resins having an epoxy functionality of at least about 2, and preferably greater than about 2, to about 6, and preferably greater than about 2 to about 5. The epoxy novolac resins include low molecular weight resins having an epoxide equivalent weight (EEW) of about 100 to about 220, and preferably an EEW of about 150 to about 210.

Epoxy novolac resins include for example, but are not limited to, epoxy phenol novolac resins. Epoxy phenol novolac resins are represented by general structural formula (VI) wherein n is about 0.2 to about 4.

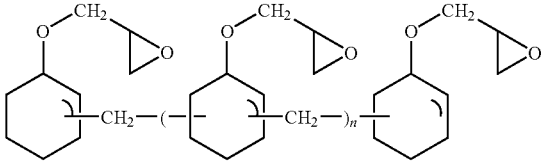

The multifunctional epoxy phenol novolac resins contain a phenolic hydroxyl group per phenyl ring in random para-para', ortho-para', and ortho-ortho' combinations. Epoxidation with epichlorohydrin yields the highly functional epoxy phenol novolac resins. The epoxy phenol novolac resin can be a high viscosity liquid (i.e., n about 0.2) or a solid (i.e., n greater than 3).

Non-limiting examples of epoxy phenol novolac resins useful as the adhesive resin binders are ARALDITE® EPN 1139 available from CIBA-GEIGY Corp., Hawthorne, N.Y., and D.E.N. 431, available from Dow Chemical Co., Midland, Mich. These epoxy phenol novolac resins have an n value (from structural formula I) of 0.2, an EEW of 175 and an epoxy functionality of 2.2. Other non-limiting examples of epoxy phenol novolac resins are D.E.N. 438 and ARALDITE® EPN 1138, available from Dow Chemical Co. and CIBA-GEIGY Corp., respectively, and having an n value of 1.6, an EEW of 178 and an epoxy functionality of 3.6; and D.E.N. 439 available from Dow Chemical Co. and having an n value of 1.8, an EEW of 200 and an epoxy functionality of 3.8.

Another useful class of epoxy novolac resins is the epoxy cresol novolac resins depicted in general structural formula (VII), wherein n is about 1.7 to about 4.4.

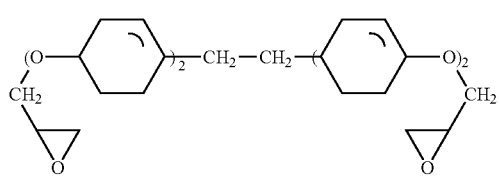

The epoxy cresol novolac resins are prepared by glycidylation of o-cresol-formaldehyde condensates in the same manner as the epoxy phenol novolac resins. The epoxy functionality of the epoxy cresol novolac resins is about 2.7 to about 5.4.

Other useful epoxy novolac resins, i.e., polyfunctional epoxy resins, include but are not limited to a polynuclear phenol-glycidyl ether resin, such as the tetraglycidyl ether of tetrakis(4-hydroxyphenyl)ethane depicted in structural formula (VIII), and having an EEW of about 185 to about 210 and a theoretical epoxy functionality of four.

(VIII)

A tetraglycidylmethylenedianiline resin exemplified in structural formula (IX), as N,N,N',N'-tetraglycidyl-4,4'-diaminophenylmethane, having an EEW of about 117 to about 133 and an epoxy functionality of about 4 also can be used as the epoxy novolac resin.

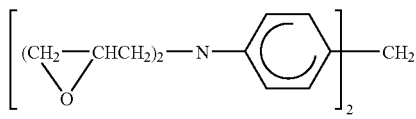

(IX)

In addition, triglycidyl p-aminophenol resins, available from CIBA-GEIGY Corp., and having an EEW of about 105 to about 114 and an epoxy functionality of about 3 can be used as the epoxy novolac resin.

Another exemplary epoxy novolac resin is a triglycidyl isocyanurate depicted in structural formula (X) and having an epoxy functionality of about 3 and an EEW of about 108.

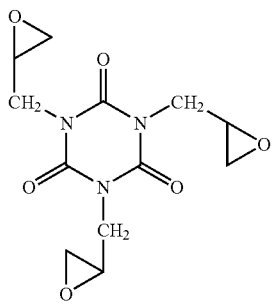

An epoxy novolac resin provides a sufficient number of cross-linking sites such that the resulting anhydride-cured epoxy nanocomposite composition is rigid and has an unexpectedly high Tg.

Any curing agent, e.g., an amine or anhydride curing agent, can be used to cure the above-described epoxy resins. Some of the available anhydride curing agents for epoxies, together with their suggested cure schedule, are listed in Table I:

| CURING AGENT | SUGGESTED CURE SCHEDULE |
| --- | --- |
| Nadic methyl anhydride | 2 hours at 90° C.[+] |
| (NMA) | 4 hours at 165° C.[+] |
|  | 16 hours at 200° C.[+] |
| Hexanhydrophthalic anhydride | 2 hours at 100° C.[+] |
| (HHPA) | 1-6 hours at 150° C.[+] |
| Trimellitic anhydride | 24 hours at 150-180° C.[+] |
| (TMA) |  |
| Docecenyl succinic anhydride | 2 hours at 100° C.[+] |
| (DDSA) | 4-6 hours at 150° C.[+] |
| Phthalic anhydride | 24 hours at 120° C.[+] |
| (PA) | 8 hours at 150° C.[+] |
| Methyl hexahydrophthalic anhydride | 3 hours at 100° C.[+] |
| (MHHPA) | 6 hours at 140° C.[+] |
| Tetrahydrophthalic anhydride | 24 hours at 120° C.[+] |
| (THPA) | 8 hours at 150° C.[+] |
| Methyl tetrahydrophthalic anhydride | 2 hours at 90° C.[+] |
| (MTHPA) | 4 hours at 150° C.[+] |

Flexible epoxies are available from a variety of commercial sources including Shell Co., Ciba, and The Dow Chemical.

Bisphenol A type EPON-828 (Shell Co.), is an epoxy resin precursor with the bisphenol A structure and a molecular weight of 380, and has the formula:

Epon 828 (Shell)

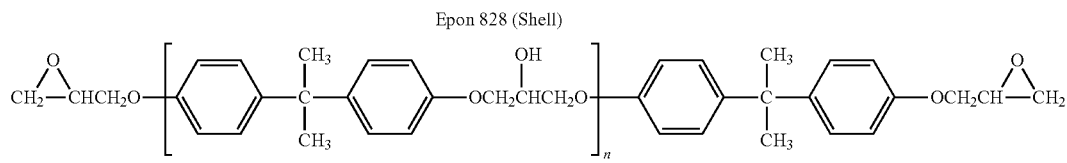

wherein n=0 (88%); n=1 (10%); n=2 (2%).

Bisphenol-A type. DER 331 (Dow Chemical Co., Midland, Mich.), is an epoxy polymer precursor and is an analog to Epon-828 having the formula:

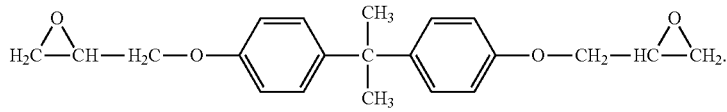

Bisphenol-F type. DER 354 (Dow Chemical Co.) is an epoxy polymer precursor having the formula:

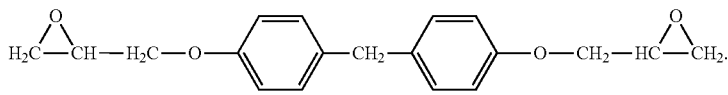

Novolac type. DER 43. DER 438 and DER 439 (Dow Chemical Co.) are epoxy polymer precursors having the formula:

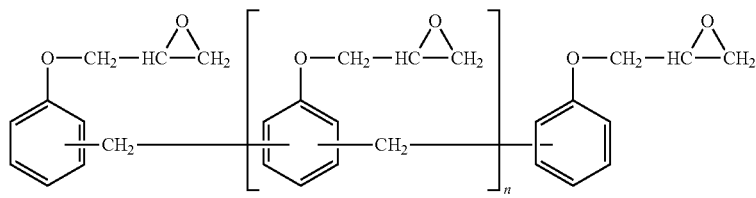

wherein n is between about 0.2 and 1.8.

Epoxy polymer, DER 732 (Dow Chemical Co.) is an epoxy resin precursor of the general formula:

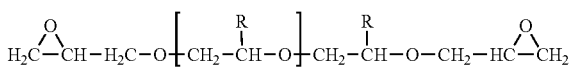

There are numerous other types of epoxy polymer precursors which are suitable and which are well known to those skilled in the art.

Amine curing agents are the preferred curing agents used to cure the epoxy resin precursors into a flexible epoxy resin. The most preferred curing agents are polyoxypropylene di- or triamines which are sold as JEFFAMINES. Huntsman Chemical Company, Austin, Tex. Most preferred are the polyoxypropylene diamines (D-series) of the formula:

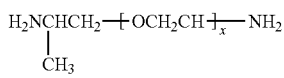

wherein x is between about 4 and 40.

The preferred diamines when sued as curing agents for the epoxy resin precursors produce a glass transition temperature of less than ambient temperatures (25° C.) and preferably less that 0° C. As a result, when cured to a pristine epoxy resin while in contact with the basalt particles, the resins are flexible when x is between about 4 and 40 in the polyoxypropylene diamine. The cured epoxy resin is also elastic.

The T series JEFFAMINES can be used. These are

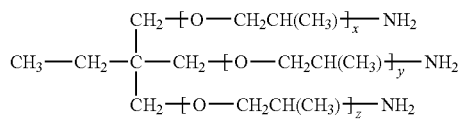

wherein x+y+z is between about 4 and about 120.

Various other epoxy resin curing agents, such as amides, can be used. The amide curing agents are for instance

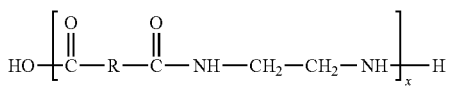

wherein x is between about 5 and 15.

Examples of other suitable adhesive resins include: binders comprising carboxylic acid and anhydride polymers and β-hydroxyalkylamides as crosslinkers. The molar ratio of carboxyl groups to hydroxyl groups is preferably 1:1. Examples are described in U.S. Pat. No. 4,076,917, incorporated herein by reference. Other suitable adhesive binders are mixtures of high molecular weight polycarboxylic acids and polyhydric alcohols, alkanolamines or polyacid amines. Suitable high molecular weight polycarboxylic acids are polyacrylic acid, copolymers of methyl methacrylate/n-butyl acrylate/methacrylic acid and of methyl methacrylate/methacrylic acid. The polyhydric alcohols and alkanolamines include 2-hydroxymethyl-1,4-butanediol, trimethylolpropane, glycerol, poly(methylmethacrylate-co-hydroxypropyl acrylate), diethanolamine and triethanolamine. Maleic acid can be included as a possible comonomer for preparing the high molecular weight polycarboxylic acids. Additional examples of these adhesive binders are described in EP 445 578, incorporated herein by reference.

Suitable formaldehyde-free aqueous binders are described in EP 583 086, incorporated herein by reference. These binders require a phosphorus-containing reaction accelerant to provide adequate reinforcing fiber web strengths. The binders comprise a polycarboxylic acid having at least 2 carboxyl groups and optionally also anhydride groups. Polyacrylic acid is preferred, but copolymers of acrylic acid with maleic anhydride are also useful. The binder further comprises a polyol, for example glycerol, bis[N,N-di(β-hydroxyethyl) adipamide, pentaerythritol, diethylene glycol, ethylene glycol, gluconic acid, β-D-lactose, sucrose, polyvinyl alcohol, diisopropanolamine, 2-(2-aminoethylamino)ethanol, triethanolamine, tris(hydroxymethylamino)methane and diethanolamine. A phosphorus-containing reaction accelerant is omittable only if a highly reactive polyol is used such as β-Hydroxyalkylamides.

Additional examples of useful adhesive binders for the basalt particles in the coatings and panels described herein include a condensation product of a methylene donor and a methylene acceptor, either pre-condensed, or condensed in-situ while in contact with the basalt particles. The term "methylene donor" is intended to mean a compound capable of reacting with a methylene acceptor (such as resorcinol or its equivalent containing a reactive hydroxyl group) and generate the resin outside of contact with the basalt particles, or in-situ. Preferably, the components of the condensation product include a methylene acceptor and a methylene donor. The most commonly employed methylene acceptor is a phenol, such as resorcinol, while the most commonly employed methylene donor is a melamine, such as N-(substituted oxymethyl)melamine. The effect achieved is resin formation in-situ while in contact with the basalt particles, creating a bond between the basalt particles, irrespective of whether the basalt particles have been pretreated with an additional adhesive, such as a polyepoxides or the like. Examples of other methylene donors which are suitable for use in the basalt powder compositions described herein include melamine, hexamethylenetetramine, hexaethoxymethylmelamine, hexamethoxymethylmelamine, lauryloxymethyl-pyridinium chloride, ethoxy-methylpyridinium chloride, trioxan hexamethoxy-methylmelamine, the hydroxyl groups of which may be esterified or partly esterified, and polymers of formaldehyde, such as paraformaldehyde. In addition, the methylene donors may be N-substituted oxymethylmelamines, of the general formula:

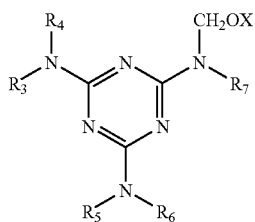

wherein X is an alkyl having from 1 to 8 carbon atoms $R^3$, $R^4$, $R^5$, $R^6$ and $R^7$ are individually selected from the group consisting of hydrogen, an alkyl having from 1 to 8 carbon atoms and the group —$CH_2OX$. Specific methylene donors include hexakis (methoxymethyl)melamine; N,N',N''trimethyl/N,N', N''-trimethylol-melamine; hexamethylolmelamine; N,N',N''-dimethylolmelamine; N-methylol-melamine; NN'-dimethylolmelamine; N,N',N''-tris(methoxymethyl)melamine; and N,N',N''-tributyl-N,N',N''-trimethylol-melamine. The N-methylol derivatives of melamine are prepared by known methods.

The amount of methylene donor and methylene acceptor, pre-condensed or condensed in-situ, that are present in the basalt powder composition may vary. Typically, the amount of pre-condensed methylene donor and methylene acceptor is present will range from about 0.1% to about 15.0%; or each can be added separately in an amount of about 0.1% to about 10.0%, based on the weight of basalt powder in the composition. Preferably, the amount of each of a methylene donor and methylene acceptor added for in-situ condensation ranges from about 2.0% to about 5.0%, based on the weight of basalt powder in the composition, to obtain the maximum basalt content for greater ballistic protection.

The weight ratio of methylene donor to the methylene acceptor may vary. Generally speaking, the weight ratio will range from about 1:10 to about 10:1. Preferably, the weight ratio ranges from about 1:3 to 3:1.

Resorcinol-free adhesive resins also are useful in the basalt compositions described herein. For example, U.S. Pat. No. 5,298,539, incorporated herein by reference, discloses at least one additive selected from the group consisting of derivatives of melamine, acetoguanamine, benzoguanamine, cyclohexylguanamine and glycoluril monomer and oligomers of these monomers. These derivatives are substituted on average at two or more positions on the monomer or each unit of the oligomer with vinyl terminated radicals and the composition is free of resorcinol.

Other resorcinol-free adhesive resins and adhesive compounds that are useful in the basalt compositions include those described in U.S. Pat. Nos. 5,891,938 and 5,298,539, both hereby incorporated by reference. The '938 patent discloses a self-condensing alkylated triazine resin having high imino and/or methylol functionality. U.S. Pat. No. 5,298,539 discloses substituted derivatives based on cyclic nitrogen compounds such as melamine, acetoguanamine, cyclohexylguanamine, benzoguanamine, and similar alkyl, aryl or aralkyl substituted melamines, glycoluril and oligomers of these compounds. In particular, the adhesive resins and adhesive compounds which are useful as the adhesive resins in the basalt compositions described herein include the following: adhesive resins selected from the group consisting of derivatives of melamine, acetoguanamie, benzoguanamine, cyclohexylguanamine and glycoluril monomers and oligomers of these monomers, which have been substituted on average at two or more positions on the monomer or on each unit of the oligomer with vinyl terminated radicals, the adhesive being free of resorcinol; and, these derivatives which have been further substituted on average at one or more positions with a radical which comprises carbamylmethyl or amidomethyl.

Further, the adhesive resin can be any of the compounds of the following formulas:

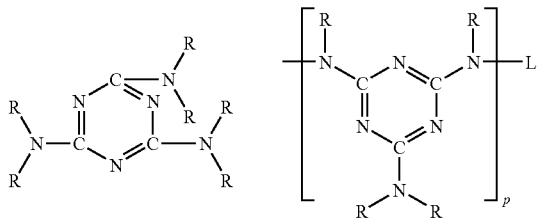

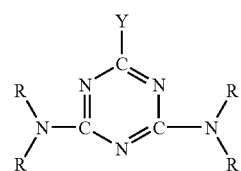

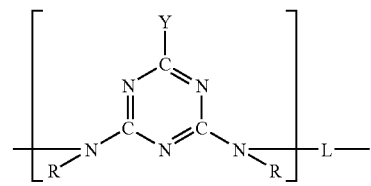

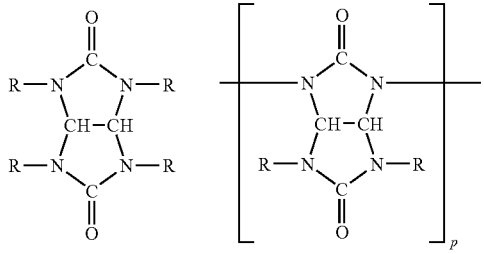 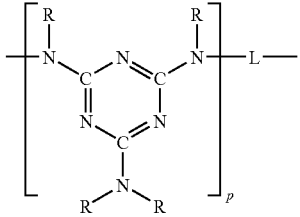

and positional isomers thereof,
wherein, in each monomer and in each polymerized unit of the oligomers, Y is selected from methyl, phenyl and cyclohexyl, and, on average,
at least two R are —$CH_2$—$R^1$,
and any remaining R are H, and
at least 2 $R^1$ are radicals selected from $CH_2$=C($R^2$)—C(O)—O—, $CH_2$=C($R^2$)—C(O)—Z, $CH_2$=C($R^2$)—C(O)—NH—, and $CH_2$=C($R^2$)—$CH_2$—O—, wherein $R^2$ is hydrogen or $C_1$-$C_{18}$ alkyl, and Z is a radical selected from

—O—$CH_2$—$CH_2$—O—,

—O—$CH_2$—CH($CH_3$)—O—,

—O—$CH_2$—$CH_2$—$CH_2$O—, and

—O—CH($C_2H_5$)—O—, and any remaining $R^1$ radicals are selected from

—O—$R^3$,

—NH—C(O)—$OR^4$, and

—NH—C(O)—$R^4$, and wherein $R_3$ is hydrogen or $R_4$, and
$R_4$ is a $C_1$-$C_{18}$ alkyl, alicyclic, hydroxyalkyl, alkoxyalkyl or aromatic radical, and in the oligomers,
P is 2 to about 10, and L is methylene or the radical

—$CH_2$—O—$CH_2$—.

These adhesive compounds are particularly useful, wherein on average at least one $R^1$ in each monomer or in each oligomerized unit is —NH—C(O)—$OR^4$, particularly the compounds of the following formulas:

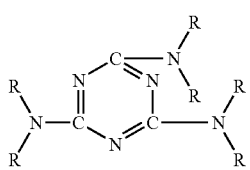

Particularly useful adhesive resins include the above formulas wherein on average, at least one R radical in each monomer or in each oligomerized unit is

—$CH_2$—NH—C(O)—$OR^4$, wherein $R^4$ is a $C_1$-$C_{18}$ alkyl, alicyclic, hydroxyalkyl, alkoxyalkyl or aromatic radical, and wherein, on average, at least two R radicals are selected from $CH_2$=C($CH_3$)—C(O)O—$C_3H_6$—O—$CH_2$— and $CH_2$=$CH_2$—C(O)O—$C_2H_4$—O—$CH_2$— and at least one R radical is selected from

—$CH_2$—NH—C(O)—O—$CH_3$, and

—$CH_2$—NH—C(O)—O—$C_3H_7$.

These adhesive resins and compounds can include additional additives, particularly those selected from hydroxymethylated and alkoxymethylated (alkoxy having 1-5 carbon atoms) derivatives of melamine, acetoguanamine, benzoguanamine, cyclohexylguanamine and glycoluril and their oligomers.

Additional adhesive resins useful in the basalt powder compositions described herein include self-condensing alkylated triazine resins selected from the group consisting of (i), (ii), and (iii):

(i) a self-condensing alkylated triazine resin having at least one of imino or methylol functionality and represented by formula (I)

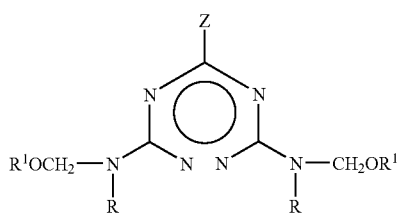

(ii) an oligomer of (i), or
(iii) a mixture of (i) and (ii), wherein
Z is —N(R)($CH_2OR^1$), aryl having 6 to 10 carbon atoms, alkyl having 1 to 20 carbon atoms or an acetyl group,
each R is independently hydrogen or —$CH_2OR^1$, and
each $R^1$ is independently hydrogen or an alkyl group having 1 to 12 carbon atoms,
provided that at least one R is hydrogen or —$CH_2OH$ and at least one $R^1$ is selected from the alkyl group; and
wherein the basalt powder-containing composition is substantially free of methylene acceptor coreactants.

These adhesive resins are particularly useful wherein at least one R group is hydrogen and/or wherein at least one $R^1$ group is a lower alkyl group having 1 to 6 carbon atoms, particularly where the adhesive resin is a derivative of melamine, benzoguanamine, cyclohexylguanamine, or acetoguanamine, or an oligomer thereof.

One particularly useful alkylated triazine adhesive resin of the above formula is wherein Z is —N(R)(CH$_2$OR$^1$).

The compositions containing an adhesive such as a cobalt salt of an organic acid, hydroxybenzoic acid, and resorcinol, also function to increase the adhesion between the basalt powder particles.

Another adhesive resin useful herein, is N-(substituted oxymethyl)melamine and at least one of α- or β-naphthol. This adhesive resin employs the monohydric phenols, α- or β-naphthol, as methylene acceptors in the resin forming reaction during vulcanization in the absence of resorcinol.

Another suitable class of adhesive resins useful herein to adhere the basalt particles together, are those which are applied in multi-stage processes, for instance a blocked isocyanate being applied in combination with polyepoxide and the material then being treated using customary resorcinol-formaldehyde resins. Additional useful adhesive resins include, for example, a reaction product of triallyl cyanurate, resorcinol and formaldehyde or p-chlorophenol, resorcinol and formaldehyde.

Other suitable adhesive resins include polyurethane resins, phenol aldehyde resins, polyhydric phenol aldehyde resins, phenol furfural resins, xylene aldehyde resins, urea formaldehyde resins, melamine formaldehyde resins, alkyd resins, polyester resins, and the like.

In one embodiment, the articles described herein are manufactured such that the basalt particles are contained essentially throughout the article and the composite article is manufactured in a single layer, having basalt particles contained throughout the entire thickness of the article. The article can contain powdered or granular basalt particles distributed throughout any portion of the article during or after manufacture.

The basalt-containing articles can be manufactured to include a layer of other material, e.g., aluminum or steel, or a sheet of woven or non-woven sheet material on one or both major exterior surfaces, or as an interior layer, of a laminated, multi-layer product.

Reinforcing Fibers

Various reinforcing materials can be included within the interior and/or on the exterior of the article to provide structural reinforcement or to provide various degrees of article rigidity; portions of the article along its thickness can be manufactured to include different reinforcing fibers or the same reinforcing fibers having different sizes, lengths, thicknesses and densities; portions of the article along its thickness can be left with low concentrations of, or without, basalt particles; and powdered or granular basalt particles can be intermixed with fibers being deposited from a fiber deposition devices during the fall by gravity of the fibers onto a support surface while depositing adhesive resin-coated basalt particles to form the articles or coatings. Alternatively, the reinforcing materials can be combined with the resin and basalt particles in the production of articles by contact molding, RIM (injection molding), or RTM (transfer molding). Any of these features can be used alone or together with any of the other features to provide very unique basalt-containing articles having any number of different properties and the capability of providing a ballistic shield or a damage-resistant coating on any substrate.

Turning now to the drawings, and initially to FIG. 1, there is illustrated one embodiment of a method and apparatus for manufacturing the powdered or granular basalt particle-containing articles described herein, comprising a mass of intertangled fibers, e.g., glass fibers surrounded by basalt particles or granules and an adhesive resin, reinforced by the surrounding fibers. The apparatus, generally designated by reference number 10, includes a fiber dispensing vessel, generally designated by reference numeral 12, that deposits fibers 13, e.g., glass fibers, or other natural and/or synthetic reinforcing fibers, by gravity onto a support surface.

In accordance with one embodiment of the articles described herein, a continuous woven or non-woven mat, fabric or film 14 can be deposited onto the support surface, e.g., conveyor belt 15, as an outer layer for adhesive securement to subsequently deposited fibers 13, adhesive resin 17 and basalt particles 18 forming mat 19. In the preferred embodiment, the basalt particles 18 are deposited from particle dispensers 22 simultaneously with the adhesive resin 17 and basalt particles 18. In another embodiment, a loose mat of fibers 13 is formed first and the basalt particles 18 and adhesive resin 17 are deposited onto the loose mat 19 and penetrate into at least a surface portion of the mat 19. In this embodiment, the mat 19 has sufficient porosity between fibers 14 to receive powdered or granular basalt particles 18 after formation of the loose mat 19. Preferably, the fibers 13, the adhesive resin 17 and basalt particles 18 are deposited simultaneously and the fibers and/or the basalt particles contain a sufficient amount of the adhesive resin binder 17 to adhere the basalt particles 18 together surrounding the reinforcing fibers 13. In either method of manufacturing the article, the deposited fibers 13, adhesive resin 17 and basalt particles 18 can be compressed, e.g., by rollers 30, 31, 36 and 38, prior to or during curing of the adhesive resin to densify the product if desired. A suitable cutting device (not shown) is stationed downstream from compression rollers 36,38 to cut the formed article into any desired size.

As shown in FIG. 1, during the deposition of a suitable thickness, e.g., about 1 mm to about 250 mm, of fiber(s) 13, the powdered or granular basalt particles 18 are deposited with the fibers 13 to form the mat 19. The basalt particles 18 are deposited by gravity from one or more suitable powdered or granular basalt holding vessels 22. To assure complete adherence of adjacent basalt particles, adhesive resin spray devices 21,23 and/or 25 can be disposed to spray the fibers 13 and/or basalt particles 18 during deposition for better adherence of the powdered or granular basalt particles 18 together and to the fibers 13. The intertangled fiber(s) e.g., glass fibers 13, have an individual fiber length of about 1 mm to about 250 mm.

In accordance with another embodiment of the basalt particle-containing articles and coatings described herein, also shown schematically in FIG. 1, the articles can be manufactured to include an internal layer of a reinforcing film or fabric 27 by employing a second fiber dispensing device 28, also disposed above the conveyor belt 15 but downstream from the first fiber dispensing device 12. In accordance with this embodiment, the film or fabric, e.g., a woven or non-woven aramid, e.g., KEVLAR, or a woven or non-woven basalt fiber fabric layer can be positioned internally during the manufacture of the article, as shown in solid lines, or positioned as an outer layer, as shown in dashed lines, as additional reinforcing fibers or fabric, and/or as a projectile catching layer. One or more adhesion promoters, in an amount of about 0.1% to about 10% by weight, such as disclosed in U.S. Pat. No. 6,884,832, hereby incorporated by reference, may be added to the basalt/resin composition to aid in adhering a film or fabric to the basalt/resin composition.

The second fiber dispensing device 28 can dispense the same fibers 13, as deposited from the first fiber dispensing device 12, or can dispense different fibers, or long, intermingled or aligned strands (not shown) of fibers to achieve additional reinforcing strength. Like the first layer 19 of composite material deposited from fiber dispensing device 12, basalt particle dispensers 22 and adhesive resin spray devices 21, 23 and 25 also containing a curing catalyst and/or curing accelerator; the second layer of composite material 29, preferably is deposited simultaneously with adhesive resin 31, from adhesive resin spray devices 33, 35 and 37; and simultaneously with basalt particles from particle dispensers 41 and 48. After compression by opposed roller pairs 30,32 and 36,38, the continuous article is conveyed through a curing oven 40.

The mats and panels manufactured to include the adhesive resin binder 17/31 and basalt particles 18/39, preferably also containing reinforcing fibers 13, and optionally one or more reinforcing film or fabric layers 14/27, can form any layer of any known armor or shield structure to provide superior protection, as well as stopping multiple ballistic projectiles by themselves. Other additives or additional layers, in addition to the basalt/adhesive resin and optional reinforcing, e.g., glass fibers and fabrics, include ceramic spheres, metal plate, aluminum armor plate, fiberglass sheets and a layer (interior or exterior) of the structures described in U.S. Pat. Nos. 3,532,057; 3,705,558; 4,061,815; 4,090,005; 4,969,386; 5,314,725; 5,134,725; 5,361,678; 5,763,813 and GB 2,272,272, incorporated herein by reference.

EXAMPLE 1

One manufacturing process for the manufacture of a handmade, basalt particle-containing plate or panel is as follows:

A homogeneous layer of basalt infused (20% by weight basalt powder) polyester resin was brushed onto a waxed, flat mold surface. One (1) layer of a 1½ oz. chopped strand fiberglass, non-woven mat having a silane binder was then applied over the basalt/resin composition. The following layers are alternated: (1) a non-woven fiberglass mat, (2) 24 oz. woven fiberglass roving, (3) non-woven fiberglass mat, (4) 24 oz. woven fiberglass roving, etc., with a coating of basalt/resin composition brushed onto each applied fiberglass layer. The first fiberglass layer is a mat to achieve a smooth surface finish. After applying five non-woven mats and three woven roving layers, or ⅜" thickness, the laminated product (resin) is allowed to cure. The plate or sheet is then popped off the mold and trimmed with a jig saw or skill saw. The basalt/resin coating composition was as follows:

10 lbs. polyester resin with curing agent
2 lbs basalt powder <0.044 mm
1½ to 2% MEK solvent FIG. 6 shows an exceptionally effective multi-layer ballistic shield 80 formed from multiple, alternating layers of (1) a fiberglass non-woven mat and/or woven fiberglass roving reinforced resin/basalt particle panels 82 made as described in Example 1, separated by (2) layers of a woven basalt fiber fabric 84. This ballistic shield 80 can be formed with any number of alternating layers of panels 82 and woven basalt fiber fabric 84 to prevent the penetration of multiple 50 caliber machine gun projectiles.

Figure 3A:
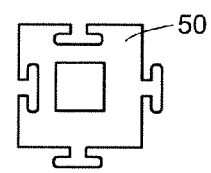
FIG. 3A is a bottom view of the basalt particle-containing building block shown in FIG. 3.
Figure 4:
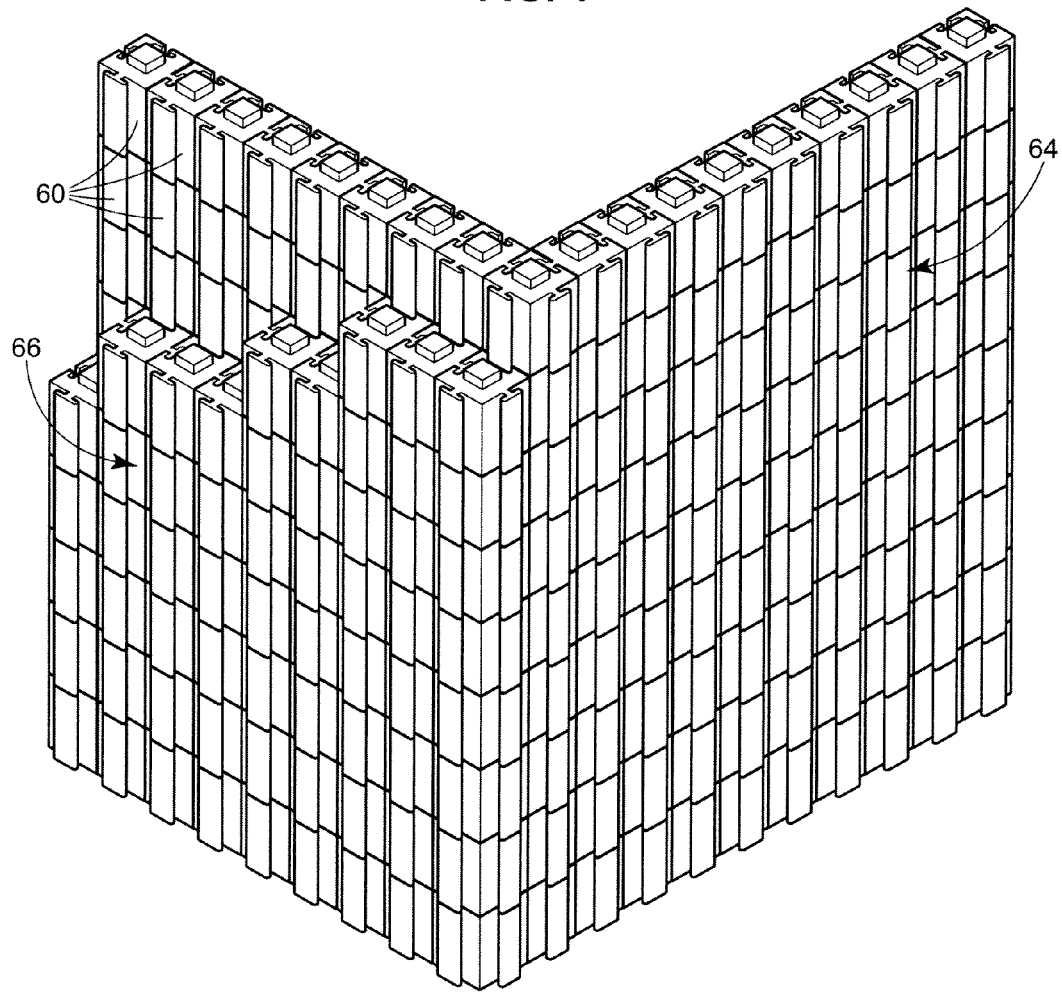
FIG. 4 is a perspective view of a wall erected from a plurality of the interconnecting building blocks shown in FIGS. 3 ad 3A.

As shown in FIGS. 3, 3A and 4, the basalt particle-containing composite articles manufactured, as described, can be manufactured in the form of building blocks of any size and shape, and can be positioned as one to a few large blocks 50 in front of a structure or area to be protected from projectiles and/or explosions, or can be easily assembled, and disassembled, from smaller blocks 60 (as shown in FIG. 4) into a protective wall, e.g., to form a mobile bunker. If the assembled wall is positioned permanently, the blocks can be adhered together at their matrix surfaces with a suitable adhesive, e.g., an epoxy resin. Any number of layers of building blocks 50 or 60 can be assembled, as shown in FIG. 4, having a single layer wall 64 facing one direction, and a double layer wall 66 connected thereto and at a 90° angle from the single layer wall 64.

In accordance with another embodiment of the articles that are manufactured as described herein to contain basalt particles, an adhesive binder, and reinforcing fibers and/or reinforcing films or fabrics, FIG. 5 shows a curved protective shield 70 useful to military and police personnel 72 that is formed on a curved support surface either batch-wise on a curved support surface or mold, or continuously on a curved conveyor belt, otherwise as shown in FIG. 1.

Coating Compositions

The basalt particle-containing and adhesive resin binder articles described herein, with or without reinforcing fibers 13, such as glass fibers, also provide an excellent protective surface coating on articles to be protected from corrosion, chemical attack, and projectile penetration. Alternatively, a high concentration of resin, e.g., 80-100% resin, in the top or surface layer, e.g., a gel coat, provides a smooth attractive product, without exposed fibers. The coatings, once cured and solvent removed, can be the same compositions as the above-described mats and panels, but are applied with about 10% to about 50% by weight, preferably about 10% to about 30% by weight, additional evaporative solvent so that the viscosity of the compositions are compatible with the coating process, e.g., spray, brush, gravure, or any other known coating technique.

Whether the basalt particle-containing compositions are coatings, mats, panels or building components, the adhesive resin/basalt particle composition is mixed with an appropriate hardening or curing catalyst or agent for curing the adhesive resin to form a cured protective coating or article in the desired shape.

One coating composition suitable as the adhesive resin in the articles and coating compositions described herein is manufactured by Freecom, Inc. under the name "Ceram-Kote 54." The Freecom product is sold with instructions that allow the user to dilute or thin the resin and catalyst mixture with an appropriate solvent to provide for ease of application and for various desired surface finishing and coating qualities. Basalt particles can be added directly to the resin, with the optional addition of reinforcing fibers, films or fabrics to provide a basalt particle-containing coating for any surface.

To the base Ceram-Kote 54 coating compositions, various additives may be combined to enhance the qualities of the final coating. Such additives may include pigments for color and thixatropes to inhibit running and sagging, a variety of non-basalt ceramic powder fillers also may be added to enhance the abrasion resistant capabilities of the coatings, and selected solvents to dilute the coating for enhanced uniformity and ease of coverage of a surface being coated. The solvent or solvents should be selected on the basis of their lack of reactivity with any other components of the coating, particularly the base composition and any other additives. Isopropyl alcohol (isopropanol) and methyl-ethyl-ketone (MEK) have shown to be very good solvents in the Ceram-Kote 54 coating materials. The basalt particles should remain at a level of at least about 20% by weight, preferably at least about 30-40% by weight to about 70% by weight of the mats and panels for proper ballistic shielding properties, but may be as low as 10% by weight for corrosion and chemical protection when applied as a coating or when multiple layers are used for ballistic shielding.

U.S. Pat. No. 4,789,567, issued Dec. 6, 1988, to Freeman, which is incorporated herein by reference, discloses a protective coating of finely divided abrasion-resistant inert particles carried in a corrosion resistant epoxy resin that is diluted with a solvent and applied to a surface. The coatings of the '567 patent may be filled with basalt particles, with or without the abrasion-resistant inert particles, and cured to manufacture a ballistic shield mat or panel or coating composition, with or without reinforcing fibers, as described herein.

U.S. Pat. No. 4,968,538, issued Nov. 6, 1990, to Freemen, which is incorporated herein by reference, discloses a protective coating of finely divided abrasion resistant inert particles in a corrosion resistant epoxy resin diluted with a solvent, and further discloses the addition of a novolac resin dissolved in methyl-ethyl-ketone (MEK) and polyglycol di-epoxide resin to the epoxy resin carrying the inert particles. The basalt particles described herein can be substituted for a portion, or all, of the abrasion-resistant inert particles described therein to manufacture the shields and coating compositions described herein. Reinforcing, e.g., glass, fibers may also be added and applied separately or together.

Similarly, U.S. Pat. No. 5,936,022, to Freemen, incorporated herein by reference, discloses another protective coating composition that can be filled with basalt particles, with or without other inert particles and reinforcing fibers, applied separately or together with the coating composition, to manufacture the articles and coatings described herein.

Filler for Foamed Heat/Cold/Sound Insulation

Foamed polymers used for insulation commonly include fillers, such as ceramic, metal, carbon, or glass particles, to improve polymer properties, impart some degree of fire resistance, and to reduce cost. The basalt particles described herein provide superior fire-retardant and decreased water absorption to any foamed polymer, particularly polyurethane foam, epoxy foam, silicone foam, polyethylene foam, polypropylene foam, and the like. The basalt particles, preferably basalt powder, are added to the polymer prior to or during the foaming process, in an amount in the range of about 5% by weight to about 70% by weight, preferably about 10% by weight to about 60% by weight, more preferably about 20% by weight to about 50% by weight. One or more plasticizers or flexibilizers can be added to the polymer/basalt particle mix, particularly for rigid polymers, such as rigid epoxies, to increase the flexibility of the foam material. Useful plasticizers include castor oil, soybean oil, epoxidized soybean oil, long chain esters, such as $C_8$-$C_{24}$ esters, e.g., an alkyl adipate, and the like. The plasticizers are added in an amount in the range of 0.5% to about 20% by weight, preferably about 1% to about 10%, more preferably about 2% to about 5% by weight. Alternatively, the foamed polymer can be coated with the resin/basalt particle compositions described above, or laminated to an exterior layer of the resin/basalt particle/reinforcing sheets described above for exterior fire-retardant/fire-proofing. Further, polymeric foam and fibrous insulation materials can be coated with or laminated to the basalt particle-containing coating compositions or basalt particle-containing composite sheet materials described above for better heat/cold/sound insulation properties.

Muffler Filler

The basalt particles also are excellent packing material for surrounding a perforated conduit in the manufacture of automotive mufflers. The perforated conduit can be formed from the resin/reinforcing fiber/basalt particle composite material described herein, or may be steel or stainless steel. The perforations in the muffler conduit can be covered with a mesh material, e.g., stainless steel or a woven basalt fiber mesh to prevent the basalt particles from entering the perforated conduit. The basalt particles have extremely high thermal conductivity and high alkali resistance and sound deadening properties.

Concrete/Stucco/Drywall Reinforcement

The basalt powders, e.g., smaller than about 0.044 mm, described herein are excellent reinforcing materials for concrete when used in amounts of about 5% to about 50% by weight of the concrete composition. The aggregate can be typical stone or basalt stone. Concrete strengths up to 90 PSI can be obtained by the addition of the above amounts of basalt powder into a typical concrete composition containing Portland cement and/or gypsum together with sand and aggregate. The basalt particles also can be included together with gypsum, e.g., calcium sulfate hemihydrate, and/or Portland cement, to form a cementatious composition to reinforce and provide fire-resistance/insulation properties to stucco compositions and drywall compositions. The basalt particles can act as a high strength replacement for fly ash in concrete compositions. Similarly, the basalt particle-containing panels described above for tiles and shields can be laminated to the exterior surface of a gypsum panel for increased strength, fire-resistance, and impermeability to liquids, gases and radiation.

Composite Pipes/Shields

Fiberglass-reinforced pipe used to contain fiber optic cables, oil, hydrocarbons, gas, chemicals, particularly corrosive, acidic and caustic chemicals, are greatly improved by incorporating 5-80% by weight basalt particles into the fiber reinforced composite material, e.g., the composition described above for making ballistic shields/mats/tiles. The reinforcing fibers may be fiberglass, basalt fibers, carbon fibers, aramid fibers, e.g., KEVLAR, boron fibers, basa fibers, asbestos fibers, boron carbide fibers, and the like. The fiber-reinforced adhesive resin/basalt particle compositions described above can be cured in pipe form that is particularly useful as radiation and heat-resistant conduits, shields and coatings for pipes and shields for nuclear power plant infrastructure, x-ray shields and x-ray apparatus housings, or can be laminated to an outer surface of x-ray apparatus or other radiation sources.

FIG. 7 shows a pipe or conduit 86 formed on a mandrel by applying successive layers of (1) a woven or non-woven fiber-containing reinforcing fabric and (2) the basalt particle/adhesive resin/solvent coating compositions described herein. The conduit 86 can be formed in any known manner of forming composite material conduits, for example, as described in the following Example 2:

EXAMPLE 2

Conduit Manufacturing

Spiral wrap a 6" wide 10 mil. thick Mylar film over a rotating steel mandrel. Wrap a 2" wide ½" thick foam collar onto one end of the mandrel. Wet the mandrel with the basalt particle-containing resin with a mandrel brush. Spiral alternating layers of 1½ oz.×6" wide non-woven chopped fiberglass strand mat and followed by 6" wide×24 oz. woven fiberglass roving, wetting each layer with the basalt particle-containing resin. Leave approximately ⅛" between edges of each 1½ oz. mat for stretching when wet. Roll each layer with a grooved aluminum roller as the mandrel turns to remove entrapped air. Start and finish with 1½ oz fiberglass non-woven mat for better, smoother surface finish. After five (5) layers of non-woven fiberglass mat and three (3) layers of woven fiberglass roving have been applied to the mandrel, let the mandrel continue to rotate for faster resin solvent evaporation until the resin reaches the gel stage, then turn off the mandrel and let the resin cure. After the product is cured, turn on the mandrel machine and grind lightly while the mandrel turns; coat the outer surface of the cured conduit with a final layer of the basalt particle/resin composition using a brush for a finish coat. Let the resin in the final (top) layer cure and remove the conduit from the mandrel. Trim to desired lengths.

Rebar

The basalt particles, particularly powders having a size smaller than 0.044 mm (325 mesh) are particularly useful as rebar for strengthening concrete, has higher strength than steel and is almost 90% lighter than steel. The fiber-reinforced, e.g., fiberglass or basalt-fiber, polymer, e.g., epoxy composite containing 20-80%, preferably 50-60% basalt powder, has about the same coefficient of thermal expansion as concrete, does not permanently deform and is chemically inert.

Intumescent Coatings

Intumescent paints have been devised for use on wall surfaces of buildings, ships or other structures or vessels intended for human occupancy and which are susceptible to fires. In addition to their film forming resins, such paints contain ingredients which will react on severe heating to generate gases and form an incombustible or low combustible residue. The expelled gases expand the residue into a thin foam layer with thermal insulating properties. The foam produced from the coating must be tough and adherent so as to resist violent drafts and thermal expansion forces arising from the fire. In many instances, the residue is a carbon char which is formed by the dehydration of a polyhydric substance such as a polyalcohol. The reactions all take place within the coating so when the coating film is heated to beyond a specific elevated temperature, an intumescent additive such as the polyhydric alcohol is decomposed, generating water, carbon dioxide, ammonia and/or other heat absorbing gases that do not readily support combustion.

The intumescent coatings described herein comprise a foamable polymer, a thermal or oxidation stabilizer, a gas-generating foam agent, a char foamer, and 5-80% by weight basalt particles for strength and fire retardancy. Any foamable polymer is suitable, such as high density polyethylene or a combination of high density polyethylene and chlorinated polyethylene (see U.S. Pat. Nos. 5,834,535 and 6,184,269, hereby incorporated by reference).

Thermal and Oxidation Stabilizers:

Any suitable compatible stabilizer can be used for protection against heat and oxygen, such as a combination of distearylthiodipropionate (DSTDP) and a butylated reaction product of p-cresol and dicyclopentadiene (Wingstay L) antioxidant. In addition to such antioxidant, MgO may be added to the formulation to absorb evolved HCL produced during aging of chlorinated polyethylene and thus act as an effective dehydrochlorination stabilizer.

Gas-Generating Foaming Agents:

These agents are used to generate gases in order to foam the polymer before it is consumed by the fire. The residue that remains after burning of most organic material will have a porous char structure and will thus be an effective thermal barrier. Two preferred gas-generating agents are ammonium dihydrogen phosphate, $NH_4H_2PO_4$, and ammonium polyphosphate which emit ammonia when heated. The ammonium dihydrogen phosphate will also form phosphoric acid which will act as a catalyst to encourage char formation from polyhydroxy compounds.

Char Formers:

Any suitable compatible starch or other carbohydrate may be used in the composition to form heavy char when exposed to fire. Polyhydric alcohols also perform the same function. A preferred char former is monopentaerythritol or diphentaerythritol.

Helicopter Blades(Airfoils)

Some helicopter blades are formed from fiberglass or carbon/graphite composite materials. The inclusion of about 5% to about 80% by weight, preferably about 10% to about 50% by weight basalt particles, preferably basalt powder having a particle size smaller than 0.044 mm, as described above for the basalt particle-containing composite panels and shields, provide additional strength, lighter weight and dielectric properties to airfoils, including helicopter blades. An airplane or helicopter blade can be made from the basalt particle/resin/fiber-reinforcing composite materials described herein. In one embodiment, the airfoil is formed by laminating two identical half blades using a suitable adhesive, such as an epoxy resin. Alternatively, the airfoil can be initially molded as a unitary structure.

Although preferred embodiments have been described in detail, it should be understood that various changes and alterations can be made without departing from the spirit and scope of the invention.

The invention claimed is:

1. A method of protecting a surface comprising applying a coating composition as a continuous coating to the surface, said coating composition comprising about 10% to about 80% by weight basalt particles consisting of particles smaller than about 8mm, about 20% to about 90% by weight of an adhesive resin binder, and about 1% to about 20% by weight of an evaporative solvent.

2. The method of claim 1, wherein the basalt particles are contained therein in an amount of about 20% to about 70% by weight.

3. The method of claim 2, wherein the basalt particles are contained therein in an amount of about 30% to about 60% by weight.

4. The method of claim 3, wherein the basalt particles are contained therein in an amount of about 40% to about 50% by weight.

5. The method of claim 1, wherein the adhesive resin binder is contained in the article in an amount of about 40% to about 70% by weight.

6. The method of claim 1, wherein the adhesive resin binder is contained in the article in an amount of about 20% to about 30% by weight.

7. The method of claim 1, wherein the evaporative solvent is selected from the group consisting of isopropyl alcohol and methyl-ethyl-ketone.

8. The method of claim 1, further including reinforcing fibers in an amount of about 2% to about 50% by weight.

9. The method of claim 8, wherein the reinforcing fibers are in a form selected from the group consisting of chopped, strand, woven fabric, non-woven fabric, unidirectional fabric, twill woven fabric, a plurality of layers of unidirectional fabrics successively placed at 90° angles to each other, and combinations thereof.

10. The method of claim 8, wherein the reinforcing fibers are contained in the article in an amount of about 5% to about 40% by weight.

11. The method of claim 10, wherein the reinforcing fibers are contained in the article in an amount of about 10% to about 30% by weight.

12. The method of claim 8, wherein the reinforcing fibers are selected from the group consisting of glass, basalt, aramid, carbon, boron, basa, asbestos, boron carbide, and combinations thereof.

13. The method of claim 1, wherein the evaporative solvent is contained in the coating composition in an amount of about 1% by weight to about 10% by weight.

14. The method of claim 1, wherein 100% of the basalt particles are smaller than 0.044mm.

15. The method of claim 14, wherein at least 40% of the particles, by number, are smaller than 0.037mm, wherein at least 10% of the particles by number are a particle size between 0.025 mm and 0.037 mm.

* * * * *